United States Patent [19]
Denney et al.

[11] Patent Number: 5,300,780
[45] Date of Patent: Apr. 5, 1994

[54] MISSILE SURVEILLANCE METHOD AND APPARATUS

[75] Inventors: Joseph M. Denney, Palos Verdes Estates; Eric L. Upton, Redondo Beach, both of Calif.

[73] Assignee: TRW Inc., Redondo Beach, Calif.

[21] Appl. No.: 991,772

[22] Filed: Dec. 17, 1992

[51] Int. Cl.$^5$ ............................................. G01S 17/66
[52] U.S. Cl. .................................. 250/342; 250/332; 250/349; 250/203.6
[58] Field of Search ............... 250/332, 334, 342, 349, 250/203.6, 203.1, 206.1, 206.2, 340, 338.1, 339, 347, 353; 244/3.11, 3.16; 364/516, 517

[56] References Cited

U.S. PATENT DOCUMENTS

| | | |
|---|---|---|
| 3,829,218 | 8/1974 | Alyanak . |
| 3,860,344 | 1/1975 | Garfunkel . |
| 3,864,513 | 2/1975 | Halajian et al. . |
| 3,882,482 | 5/1975 | Green et al. . |
| 3,950,635 | 4/1976 | Constant . |
| 4,029,963 | 6/1977 | Alvarez et al. . |
| 4,048,500 | 9/1977 | Moore . |
| 4,095,900 | 6/1978 | Murphy et al. . |
| 4,128,337 | 12/1978 | Zehnpfennig . |
| 4,141,072 | 2/1979 | Perreault . |
| 4,169,245 | 9/1979 | Crom et al. . |
| 4,345,840 | 8/1982 | Goetz et al. . |
| 4,397,558 | 8/1983 | Hill et al. . |
| 4,409,475 | 10/1983 | Zehnpfennig . |
| 4,421,981 | 12/1983 | Hough . |
| 4,465,940 | 8/1984 | Graff et al. .................. 250/339 X |
| 4,490,613 | 12/1984 | Brame . |
| 4,532,639 | 7/1985 | Price et al. . |
| 4,560,275 | 12/1985 | Goetz . |
| 4,596,930 | 6/1986 | Steil et al. . |
| 4,660,151 | 4/1987 | Chipman et al. . |
| 4,678,911 | 7/1987 | Sundberg et al. . |
| 4,683,496 | 7/1987 | Tom . |
| 4,731,663 | 3/1988 | Kovalchick et al. . |
| 4,731,859 | 3/1988 | Holter et al. . |
| 4,737,642 | 4/1988 | Steil et al. . |
| 4,743,112 | 5/1988 | Burke . |
| 4,810,884 | 3/1989 | Carlson . |
| 4,864,127 | 9/1989 | Brame . |
| 4,873,632 | 10/1989 | Logan et al. . |
| 4,908,763 | 3/1990 | Sundberg . |
| 4,914,719 | 4/1990 | Conlon et al. . |
| 4,939,369 | 7/1990 | Elabd ................................ 250/332 |
| 4,996,599 | 2/1991 | Anderson . |
| 5,066,860 | 11/1991 | Zinner ........................... 250/332 X |

OTHER PUBLICATIONS

U.S. Ser. No. 991,770 filed Dec. 17, 1992, entitled "Multispectral Signature Extraction Technique" by Denney et al.
Skolnik, Merrill; *Radar Handbook*, Chapter 15, "Automatic-detection Theory", pp. 15-2 to 15-41, 1970.
Chapter 11, DETECTORS, from *Infrared Handbook*, ERIM, pp. 11-1 to 11-104, 1989.
Kidd, Col. John; "Defense Support Program: Support to a Changing World", AIAA Space Programs and Technologies Conference, 20 pages, Mar. 24-27, 1992.

*Primary Examiner*—Constantine Hannaher
*Assistant Examiner*—Edward J. Guck
*Attorney, Agent, or Firm*—Ronald L. Taylor

[57] ABSTRACT

Multispectral signature analysis techniques are used to reliably separate a missile electro-optical signal from a background. The system provides higher reliability and reduced complexity when compared to conventional approaches.

14 Claims, 5 Drawing Sheets

MISSILE SURVEILLANCE METHOD AND APPARATUS

FIELD OF THE INVENTION

The present invention relates to a method and an apparatus for providing missile and target detection.

BACKGROUND OF THE INVENTION

Strategic and tactical missile detection and target detection require basically two functions. First, is the detection of the missile launch and the burning of the propellant during acceleration into the ballistic trajectory. Secondly, the missile must be tracked to determine where it is targeted. In the event of multiple launches, the number of missiles need to be counted and tracked at substantially the same time.

Traditionally, strategic and tactical missile launch detection and tracking systems use infrared surveillance techniques employed by satellite sensors. The satellite sensors are required to view the whole earth at one time because the missiles could be launched from any location. It is necessary to determine where the missile is going and, from the trajectory, to find where the missile is likely to hit with a high probability of detection. For example, it is usually required to have a probability of detection of at least 99% and to avoid a false detection to a probability of less than once per month.

Based on these requirements, satellite sensing systems have been developed that contain many individual picture elements or pixels so that the systems can detect, count and track missiles anywhere on the earth. In order to track missiles to the accuracy required, it is generally necessary that the pixels have an extremely high resolution so that they can observe about a 1.5 kilometer square grid on the earth every few seconds. To do this with a staring array several millions of pixels are often needed. Surveillance systems using these large staring arrays are quite heavy (for example, about 6,000 to 8,000 pounds) due, in large part, to the multiplicity of pixel elements employed. To launch a satellite using such large staring arrays, expensive and heavy spacecraft launch vehicles, such as the Titan IV, must be used. This, of course, undesirably increases the cost of the project. The number of pixels can be reduced by scanning sensors but the pixels must be scanned at such a high rate that it produces an exceedingly large number of operations per second for the on-board satellite computer. Alternatively, all of the sensor data can be transmitted to the ground with a wide band data link. However, this is less desirable than on-board processing because it is less robust and radiation hard when compared with the narrow band data link that is used with on-board processing.

Many known missile detection systems sense infrared radiation in a single band. This band contains information about the missile as well as unwanted background. Another approach uses two discrete radiometers to cover two detection bands which are independently processed. Either approach suffers from problems when a strong background signal approximates or exceeds the missile within the detected band or bands. Hence, they are subject to a large number of false alarm indications when a detection threshold is set too close to the background clutter or to undesirably lower detection rates if the threshold is set too high.

It is an object of the present invention to overcome one or more of these problems.

SUMMARY OF THE INVENTION

In accordance with the teachings of the present invention, a method and apparatus for detecting, tracking and counting of missiles is provided that uses a significantly reduced focal plane complexity when compared to prior art approaches. It results in a much higher reliability and lower cost of system implementation.

In the preferred embodiment, the functions of missile detection and the functions of counting and tracking are separated into dual subsystems which are coordinated by a multispectral detection signal processor.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 5:
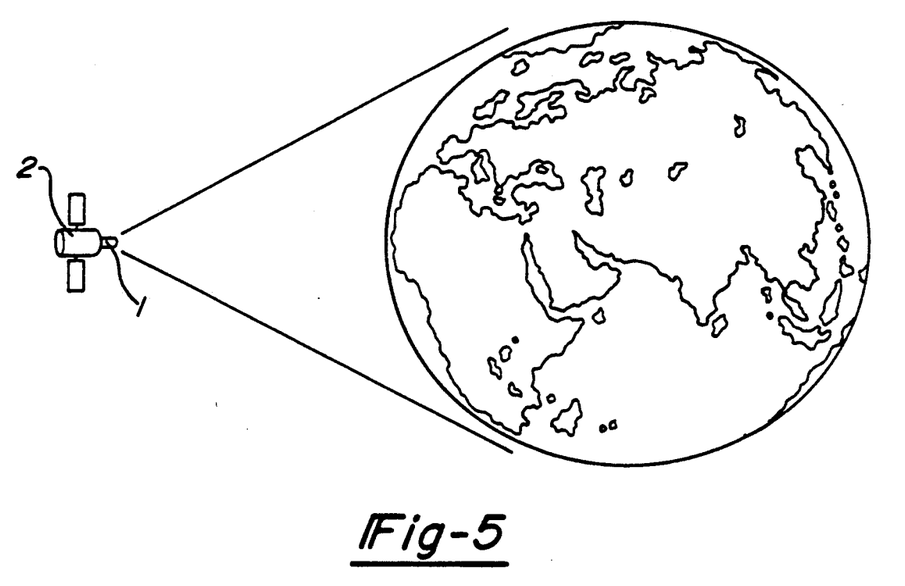
FIG. 5 schematically illustrates the missile surveillance system mounted to a satellite.

It should be noted from the outset that while this invention will be described in connection with a particular example thereof, no limitation is intended thereby since other modifications will become apparent to those skilled in the art. With that caveat in mind, the missile surveillance system 1 is shown in FIG. 5 as being mounted to a satellite 2 orbiting about the earth. As will appear, the surveillance system 1 is characterized by a lightweight construction that enables the satellite 2 to be launched into orbit by less powerful and, accordingly, less costly launch vehicles.

Figure 1:
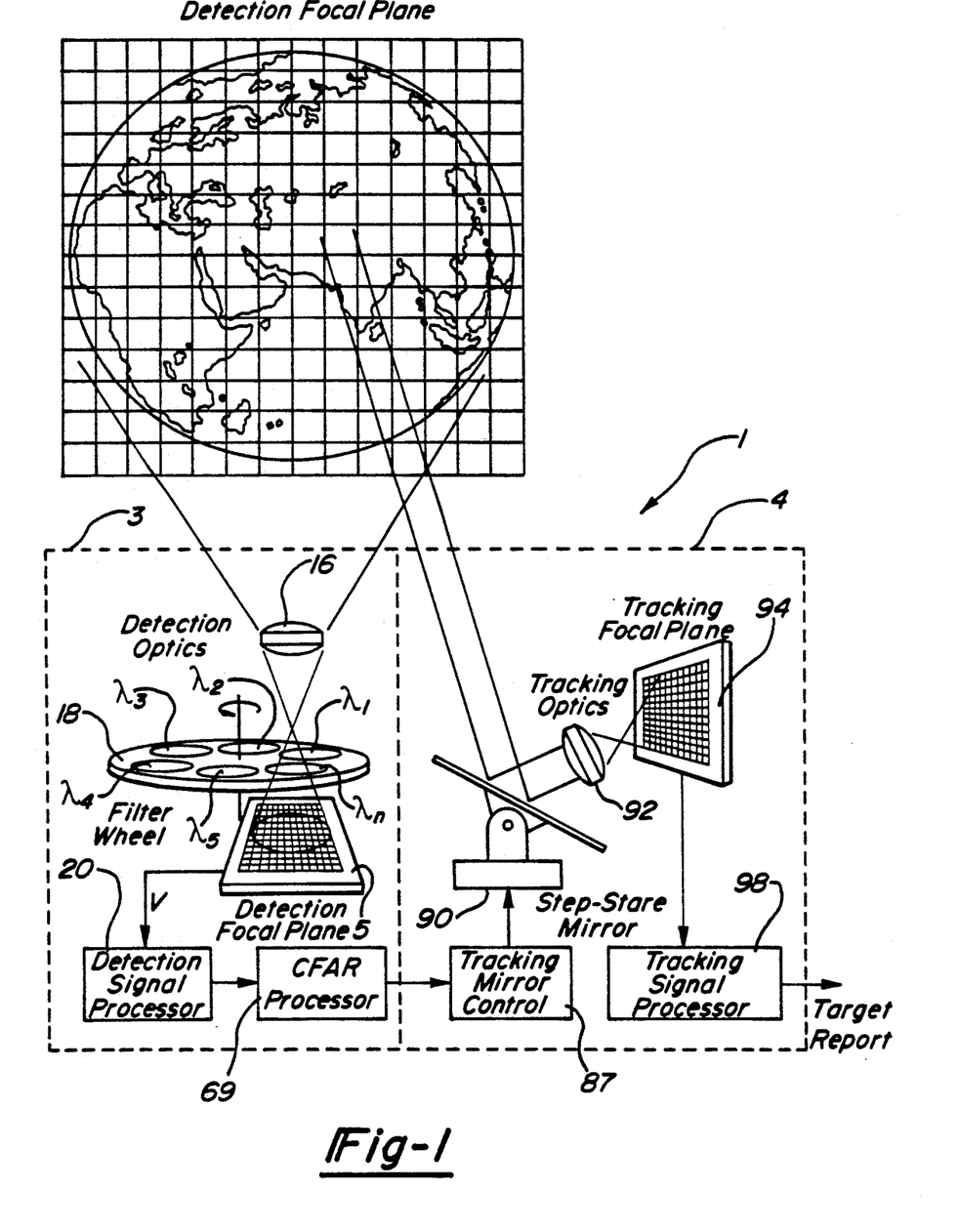
FIG. 1 is a schematic block diagram of a missile surveillance system made in accordance with the teachings of the present invention, prior to the launch of the missiles.

Turning to FIG. 1, system 1 includes two separate subsystems 3 and 4. The purpose of subsystem 3 is to detect the launch of a missile or missiles from the earth. Once a missile launch has been detected and located, subsystem 4 is used to count and track the missiles.

Detection subsystem 3 images the entire earth's surface onto a first focal plane which is preferably a staring array 5. Imaging is accomplished by way of telescopic optics 16 which images photons from the entire earth's surface through color filter wheel 18 onto the staring array 5. Staring array 5 is preferably a single monolithic InSb integrated circuit wafer having a 512 by 512 grid of pixels, although other types and sizes of arrays can be used. Such integrated circuit wafers are commercially available from Amber Engineering of Goleta, Calif.

Compared to prior art approaches, the number of pixels in the array 5 is at least an order of magnitude lower than other staring arrays conventionally used for missile surveillance. The tradeoff is that each pixel of the array 5 sees a much larger area of the earth's surface. In this embodiment, each pixel images about a 25 kilometer by 25 kilometer area of the earth's surface. For purposes of this invention, the area of the earth's surface that is imaged by each pixel is called the ground surface distance. Since each pixel observes such a large area, the array 5 can be referred to as a coarse detector. If prior art detection techniques were utilized, the use of such a large ground surface distance or footprint could result in large and unacceptable false alarm rates. This is avoided by the use of multispectral matched filter techniques used by the detection signal processor 20. As will be described, processor 20 has such high sensitivity that it can detect and locate the position of a missile after being launched without requiring the use of a large number of pixels having a much smaller footprint, as well as not requiring motion or change detection as used in the past.

The spinning color filter wheel 18 has a plurality of color filters. The filters are labeled $\lambda_1, \lambda_2 \ldots \lambda_n$ to reflect that they pass selected bands of radiation onto the array 5. In the preferred embodiment, the detection subsystem 3 operates in the infrared region of about 2.0 microns to 5.5 microns. The spectrometer 18 resolves the optical spectrum from optics 16 into a multispectral electro-optical signal input spectrum V which is applied to the signal processor 20. For purposes of this invention, a multispectral spectrum means a signal having a plurality of bands of radiation. A band is a continuum of wavelengths between two wavelength limits. Furthermore, as used in connection with this invention, the term electro-optical signal means radiation having a wavelength between 0.2 microns and 30 microns.

The spectrometer 18 illustrated in FIG. 1 generates the multispectral electro-optical signal spectrum V in serial fashion onto the array 5. For each color on the wheel, each of the pixels is illuminated or hit by that color wavelength band. As the color wheel rotates through one complete rotation, each of the color bands are in turn directed onto the array 5. When a pixel is illuminated by one of the colors at any point in time, the array 5 sends a signal to the processor 20 which records all of the illumination hits in a memory therein for a given complete rotation of the wheel. As a result, the memory generates a multispectral electro-optical signal input spectrum V that is used by the signal processor 20 to detect and locate the launch point of the missile.

An input spectrum V is generated for each pixel in array 5. The processor 20 analyzes the input spectrum V for all of the pixels. If processor 20 detects a missile's multispectral signature in a given pixel, the missile's general location (sector) is known since each pixel is assigned to a preselected sector coordinate on the earth's surface.

Figure 3:
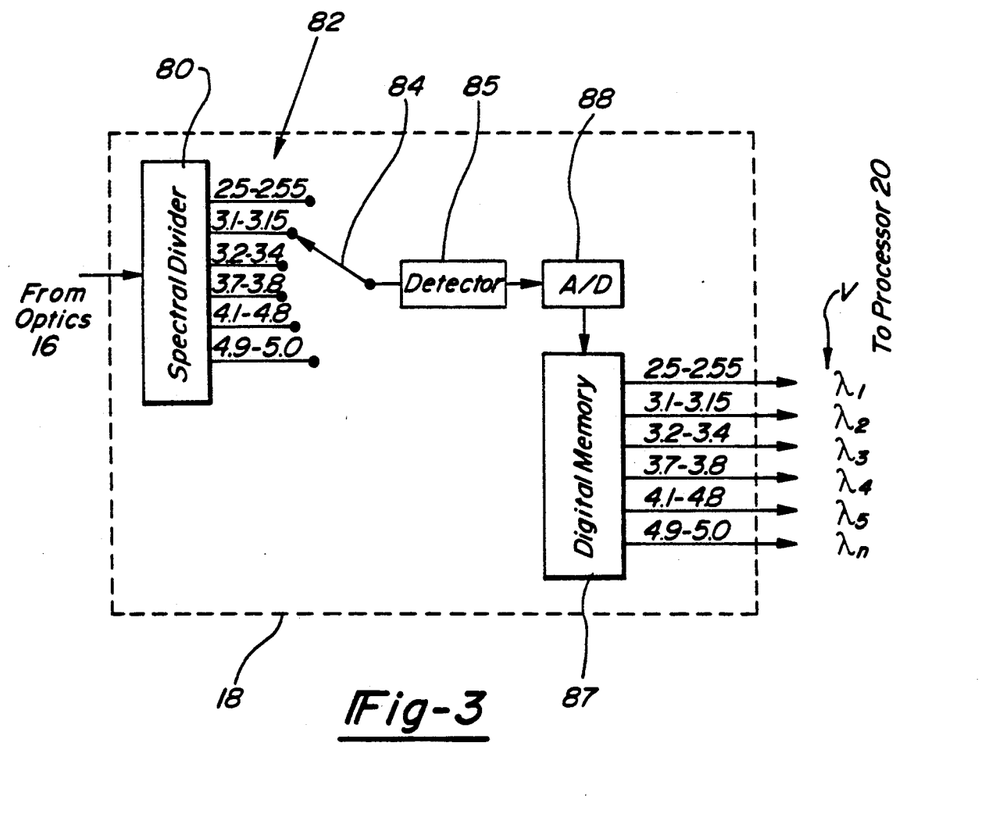
FIG. 3 is a schematic diagram of one technique for generating the input spectrum.

FIG. 3 generally illustrates the operation carried out by spectrometer 18 in more detail. The optical spectrum from optics 16 is fed to a spectral divider 80 which separates the optical spectrum into a different wavelength bands represented by lines 82. A selector 84 is employed, in the preferred embodiment, to serially connect the collected photons in each selected band to a detector 85 (e.g., a given pixel in array 5) which converts the photons into analog electrical signals. The functions of spectral divider 80 and selector 84 can be accomplished in many ways including the use of a color filter wheel (FIG. 1) or Fourier transform type spectrometers which can be functionally achieved by a Michelson-type interferometer. Alternatively, this function can be performed by an assembly of dichroic beamsplitters or a dispersive arrangement employing a prism or a grating. Analog digital converter 88 converts the analog signal into proportional digital values which are temporarily stored in memory 87. When values for all of the selected bands are stored, memory 87 can be suitably addressed to read out the band values, in parallel, for further processing. The plurality of the selected and thus created band values form the multispectral electro-optical signal input spectrum V which is applied to processor 20.

The bands are preferably chosen by using knowledge of the spectral shapes of the background and missile signatures to identify wavelengths which, when taken in combination, improve the multispectral separation of the missile(s) from the background, and from each other by providing uniquely different multispectral signals. It should be understood that various different methods can be used for choosing the bands that will comprise the multispectral input spectrum for processing. A minimum of two bands are selected, but more preferably, about six to seven bands or even up to a dozen or so bands may be used depending on the application.

Processor 20 operates on the multispectral input spectrum substantially exclusively to separate the signal of interest from the background, both of which are contained in the input spectrum V initially. While it is envisioned that several types of processor architectures can be utilized for carrying out the teachings of this invention, it will be described in FIG. 4 in connection with an infinite impulse response processor. For purposes of this invention, an "infinite impulse response processor" means a processor using negative feedback so as to be recursive in operation where the processor affects its next solution in an iterative manner.

Figure 4:
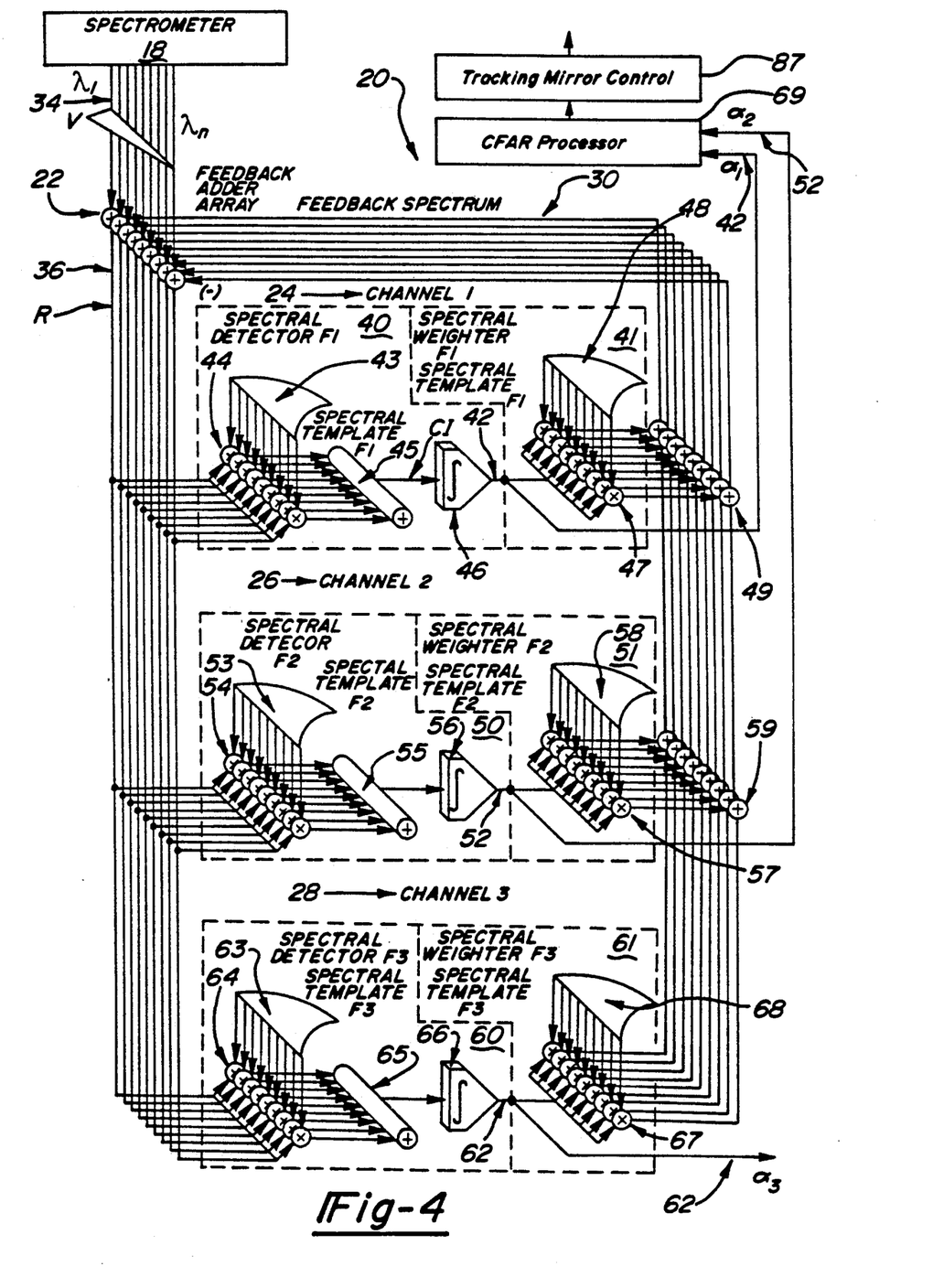
FIG. 4 is a schematic diagram showing in more detail the detection signal processor.

As will be described in more detail subsequently, the processor extracts or separates one or more multispectral missile signatures from the input spectra V. The processor includes N parallel channels each comprising a matched filter using a spectral template. N−1 channels include a known spectral template of a respective one of the N−1 missiles and the Nth channel includes a known spectral template of the background. In other embodiments, there can be multiple channels of background. The N−1 channels operate on their respective missiles of interest and the Nth channel operates on the background. The processor combines and recursively cancels the operated signals and develops a residue spectrum R of unmatched signal, if any, from the input spectrum of the scene.

This residue spectrum is a measure of the fit of the missiles to the matched filters or templates of the missiles of interest. The difference between the residue spectrum and the matched filter spectrums is a measure of the accuracy of the classification of the missiles to the expected missile signatures. Characterization of missiles is also accomplished. By using matched filters of different missiles of interest and with variations of such matched filters, missile characteristics can be uncovered and discriminated. The processor provides a measure of the quantification of the signal of interest. By measuring the magnitude of the signature of the signal of interest in a known quantity, the matched filter can be quantified. Measurement of the optical quantum efficiency of the system, noise, and other uncertainties provide a measure of the signal uncertainty and signal intensity. Including these with the signal measurement intensity provide a quantitative measurement of the signature substance column density.

In FIG. 4, a schematic diagram of the electro-optical processor 20 having an infinite impulse response (IIR) architecture is illustrated. The electro-optical processor 20 includes an input 22, a first channel 24, a second channel 26, a third channel 28 and a feedback path 30.

As previously discussed, the optical sensor 16 provides an optical signal representative of the scene of interest to the spectrometer 18. The spectrometer 18 resolves the optical signal into the multispectral electro-optical signal input spectrum V. Mathematically, it is treated as a vector. The spectrometer 18 provides this multispectral electro-optical signal input spectrum V to input 22 via conductors 34.

The input 22 is a feedback adder array and serves to combine the bands of the feedback spectrum in the feedback path 30 in a negative feedback manner (illustrated by the negative sign within parenthesis in FIG. 4) with the corresponding bands of the spectrum V on conductors 34 on a band by band basis to provide a residue spectrum R on conductors 36.

The first channel 24 includes a spectral detector F1, also designated by the numeral 40, and a spectral weighter F1, also designated by the numeral 41. Channel 24 serves as a matched spectral filter. Briefly, the spectral detector F1 operates initially on the input spectrum and then on the residue spectrum R and correlates and integrates its spectral components or bands with those supplied internally to it by a spectral template 43. Spectral Detector 40 provides an output on line 42 that is the weighting coefficient $\alpha 1$, for the template 43. The output $\alpha 1$ is a scalar signal whose magnitude is in proportion to the degree of correlation between the spectral template 43 and the spectrum fed to it. In other words, $\alpha 1$ provides an indication as to whether the missile is contained in the input spectrum. The polarity of coefficient $\alpha 1$ indicates whether an emissive or absorbance spectrum is being analyzed.

With more particularity, the spectral detector 40 comprises a spectral template 43, an array of multipliers 44, an adder 45, and an integrator 46. The spectral template 43 is a data base describing the multispectral output or signature of the missile of interest in the electro-optical bands of input spectrum V. Such a template, also known as a reference or source signature or source profile, is obtained previously by measuring the emission in the electromagnetic spectrum from a known missile. A priori knowledge of the missile type is assumed.

The spectral template can also be obtained from experimental data or calculated from formulas derived from theoretical models representing the radiation from different missiles of interest. Spectral templates can be constructed for organic and inorganic molecules, missile exhausts or plumes. The spectral template is unitless and as will be described, has the same shape as the spectrum to be identified. It has the identical number of bands as are contained in the input spectrum V.

The multipliers 44 serve to multiply each spectral band of the residue spectrum R by the corresponding band of the spectral template 43. The product formed by vector multiplication is then added by adder 45. The resulting sum forms the correlation integral (CI) of the two vectors and has a peak response when the two vectors are identical. Integrator 46 integrates the correlation integral and provides on line 42 the weighting coefficient $\alpha 1$, representing the magnitude of the correlation over time. As previously mentioned, the signal is a scalar and is bipolar.

The correlation integral (CI) is the degree of likeness between the spectral template and the residue spectrum. When the value of the integral is 0, then there is no correlation or degree of likeness. When the value is positive, then there is some likeness. When the value is negative, the recognition is inverted. Accordingly, it should be recognized that when a signal of zero magnitude is applied to the integrator 46, the integrator stops integrating. When a positive signal is applied, the integrator begins to increase indefinitely and when a negative signal is applied, the integrator provides an output that decreases indefinitely. In other words, the integrator 46 accumulates any correlation between the spectral template 43 and the residue spectrum 36 and produces a single scalar weighting coefficient, $\alpha 1$. This represents the estimate of the magnitude of the matching of the missile in spectrum 34 with spectral template 43. When $\alpha 1$ is zero, there is no component of the missile signal present.

The spectral weighter 41 includes an array of multipliers 47 and a spectral template 48. The spectral template 48 is identical to the spectral template 43. The multipliers 47 multiply each band of the spectral template 48 by the weighting coefficient, $\alpha 1$. When summed by an array of adders 49 the weighted spectral template signal has been adjusted to attempt to equal its corresponding missile component in the input spectrum V. The spectral weighter 41 generates the spectral template of interest F1 with a magnitude $\alpha 1$ as provided by the spectral detector 40. The integrator's output 42 from the spectral detector represents the current estimate of the spectral template's magnitude. When the value $\alpha 1$ is employed to adjust the feedback component for its spectral template, the integrator will servo to the value which cancels any power in the residue spectrum R that correlates with the respective channel templates.

This invention also allows for spectral template 43 to be modified to incorporate only values for F1 that are uniquely different than F2 and F3. In this case, the same knowledge used in selecting bands is used to modify template 43. Similar logic applies to the remainder of the other channels.

Channels 26 and 28 are matched filter channels similar to the channel 24 and comprise components that are identical in construction to like components in the channel 24 described above. Accordingly, there has been applied to each component in the channel 26 a reference numeral in the 50-59 series corresponding to the reference numeral in the 40-49 series that was applied to the like component of the channel 24, and there has been applied to like components of the channel 28 a reference numeral in the 60-69 series.

To describe the operation, assume that it is desired to detect two different missile types within the spectrum that includes the composite background and missile signals. Channel 1 is a matched filter for processing one of the expected missiles, channel 2 is a matched filter for processing the other expected missile type and channel 3 is a matched filter for processing the known background. Consequently, the spectral templates 43 and 48 are identical and constructed from the known signature of the first missile. The spectral templates 53 and 58 are identical and constructed from the known signature of the second missile. The spectral templates 63 and 68 are identical and measured beforehand from the background of the scene without any missiles present. The scene is scanned by the optics 16, which collects photons and transmits them to the spectrometer 18. In this discussion, it is assumed that the two missiles being sought were present during the scan. Hence the spectrometer 18 produces a multispectral electro-optical signal input spectrum V that includes the two missiles and the background present during the scan.

The bands of the spectrum V are applied to the input 22 and through the conductors 36 simultaneously to the array of the multipliers, 44, 54, and 64 of the spectral detectors 40, 50 and 60, respectively. The multipliers multiply each spectral band of the spectrum V by the corresponding band of the spectral template. The products formed by the vector multiplication are then added by the adders 45, 55 and 65 so as to produce the respective correlation integrals of the missiles and background. Integrators 46, 56 and 66 integrate the correlation integrals to produce the scalar weighting coefficients $\alpha 1$, $\alpha 2$ and $\alpha 3$ on outputs 42, 52 and 62, respectively. This represents the magnitude of the spectral templates' correlation with the input spectrum V. To adjust this correlation, the weighting coefficients are respectively applied to the multiplier arrays 47, 57 and 67 of the spectral weighters 41, 51 and 61. The multipliers multiply each band of their associated spectral templates 48, 58 and 68 by the scalar weights $\alpha 1$, $\alpha 2$ and $\alpha 3$, respectively, to attempt to recreate the multispectral signal of interest in each channel that is found in the input spectrum V.

Adder array 59 adds the vectors so developed by spectral weighters 51 and 61 and adder array 49 adds the resultant vector with the vector from spectral weighter 41 to provide the feedback spectrum in the feedback path 30. This negative feedback is combined substantially simultaneously on a band by band basis with the input spectrum at the input array 22 to recursively cancel the input spectrum V and produce the residue spectrum R. The feedback spectrum converges to match the spectrum V and thereby cancel the input spectrum if the missiles are present. The cancellation is not initially exact and the resulting residue spectrum is iteratively operated on by the processor 20 to reduce the residue spectrum to a preselected magnitude, such as a least mean square value. Detection of the two missiles occurs substantially simultaneously when their respective coefficients $\alpha 1$ and $\alpha 2$ increase above a given threshold level. It should be noted that if an expected missile was not present, the weighting coefficients $\alpha$ would tend toward zero. This would indicate that none of that missile signature component was present in the scene. The outputs $\alpha$ can be used in a variety of manners to indicate the detection of one or more missiles. For example, lines 42, 52 are shown in FIG. 4 as being coupled to a known Constant False Alarm Rate device 68 for further analyzing the characteristics of the alarm signals $\alpha$ in a known manner and to generate warning signals for transmission to ground stations when appropriate.

Detection of more than two missile types is done in a similar manner. A matched filter is used for each expected missile and its spectral template can be stored in a separate channel. For example, when nine different missile types are sought, the electro-optical processor will include ten channels, nine for extracting the nine missile types and one for matching the spectrum of the background. A matched filter is used for each expected missile and background components and their corresponding spectral templates are stored in separate channels.

The residue spectrum R, or error signal, may also be employed in some detection and quantification applications to improve template selection. A library of prerecorded spectral signatures may be searched for the best fit to the residue spectrum. Selection of a spectral signature template of another missile that is included within the composite signal will reduce the residual spectrum on successive iterations. An additional feature can include a memory which is connected between the spectrometer 18 and the electro-optic processor 20. The memory can serve to store the input spectra and provide it to the electro-optical processor at a later time. Also, preprocessed signals can be stored in the memory for completion at a later time. There is no inherent requirement for simultaneously processing the optically detected signals.

It should be appreciated that the present invention is effectively decomposing or separating the input spectrum V into its constituent multispectral components, i.e. the two missiles and the background. The output of channel 1 will be essentially the same as the multispectral signature of the first missile, provided that it is present. If there is only a small degree of correlation or matching between the spectral template 43 and the input spectrum, then the weighting coefficient $\alpha_1$ settles to a relatively low level and will not reach its preselected detection threshold value thereby avoiding false alarms. As a result, the multipliers 47 will not need to amplify the spectral template 48 as the output of channel 1 which is used as part of the feedback spectrum. On the other hand, if a preponderance of the bands of the multispectral template are found within the input spectrum, then the weighting coefficient $\alpha_1$ will accumulate thereby amplifying the template 48 as the output of channel 1. This will effectively cancel this component or signature of the first missile in the input spectrum, thereby driving the residue spectrum R back toward zero.

The present invention effectively operates even though there may not be much signal discrimination between the background and missile signals in any given band. This is because of the multispectral detection approach in which the missile and background signatures are made up of a plurality of different bands. Consequently, even though the missile and background signatures may be of substantial equal value in one band, the differences over the plurality of bands will enable accurate detection of the missile.

Mathematically, the electro-optical signal processing system can be expressed with reference to the infinite impulse response (IIR) solution (as described above) in connection with the following equations 1-7 or as a closed form solution (equations 8-10) which can be solved by a suitably programmed general purpose computer.

With respect to the IIR solution, consider the generalized N-spectrum system where the input spectrum V is to be decomposed into N constitutent spectrums, $F_1$, $F_2, \ldots, F_n$. The residue spectrum R can be written as a loop equation as follows:

$$R = V - \alpha_1 F_1 - \alpha_2 F_2 - \ldots - \alpha_n F_n \qquad (1)$$

where $\alpha_1 = F_1$ weighting coefficient
$\alpha_2 = F_2$ weighting coefficient -continued $$a_n = F_n \text{ weighting coefficient}$$

The IIR electro-optic signal processor minimizes the norm of the residue spectrum vector R over all possible weightings of constituent spectra $F_1, F_2, \ldots, F_n$.

Taking the Euclidean norm of the residue, the following is obtained $$\|R\|^2 = \left[V - \sum_{i=1}^{N} a_i F_i\right]^T \left[V - \sum_{i=1}^{N} a_i F_i\right] \quad (2)$$

$$= V^T V - \sum_{i=1}^{N} a_i F_i^T V - \sum_{i=1}^{N} a_i V^T F_i + \quad (3)$$

$$\sum_{i=1}^{N} \sum_{j=1}^{N} a_i a_j F_i^T F_j$$

$$= V^T V - 2 \sum_{i=1}^{N} a_i F_i^T V + \sum_{i=1}^{N} \sum_{j=1}^{N} a_i a_j F_i^T F_j \quad (4)$$

where T denotes the vector transpose. Taking the partial derivative with respect to each weighting coefficient, the following is obtained $$\frac{\partial \|R\|^2}{\partial a_i} = -2 F_i^T V = 2 \sum_{\substack{j=1 \\ j \neq i}}^{N} a_j F_i^T F_j + 2 a_i F_i^T F_i. \quad (5)$$

The norm of the residue vector will be at a minimum when all such partial derivatives vanish. Thus, setting equation 5 equal to zero and solving for $a_1$ yields $$2 a_i F_j^T F_i = 2 F_i^T V - 2 \sum_{\substack{j=1 \\ j \neq i}}^{N} a_j F_i^T F_j \quad (6)$$

or $$a_i = \frac{F_i^T V - \sum_{j=1, j \neq i}^{N} a_j F_i^T F_j}{F_i^T F_i}. \quad (7)$$

The closed form solution can be solved using linear algebra techniques or matrix notation expressed as $$Ma = b \quad (8)$$

Where M is an N by N matrix with row i, column j element $$m_{ij} = \frac{F_i^T F_j}{F_j^T F_i} \quad \begin{array}{l} \text{for } i = 1, 2, \ldots, N, \\ \text{for } j \neq 1, 2, \ldots, N \end{array} \quad (9)$$

and a and b are the N-dimensional vectors $$a = \begin{bmatrix} a_1 \\ a_2 \\ \cdot \\ \cdot \\ \cdot \\ a_N \end{bmatrix} \text{ and } b = \begin{bmatrix} F_1^T V / F_1^T F_1 \\ F_2^T V / F_2^T F_2 \\ \cdot \\ \cdot \\ \cdot \\ F_N^T V / F_N^T F_N \end{bmatrix} \quad (10)$$

FIG. 1 illustrates the surveillance system 1 when no missiles are detected emanating from the earth's surface. With reference to FIG. 4, this situation is characterized by a relatively low value of weighting coefficients $a_1$ or $a_2$. When the missiles are launched, the processor 20 detects this occurrence and weighting coefficients $a_1$ or $a_2$ begin to rise above a given threshold level. Thus, one or more missiles are detected. These signals on lines 42 or 52 are connected to mirror control circuitry 87 through the Constant False Alarm Rate device 69. Since the missile or missiles were detected when analyzing the input spectrum from one pixel of staring array 5 whose earth's sector coordinates are known, the coarse location of the missile(s) is also known.

Figure 2:
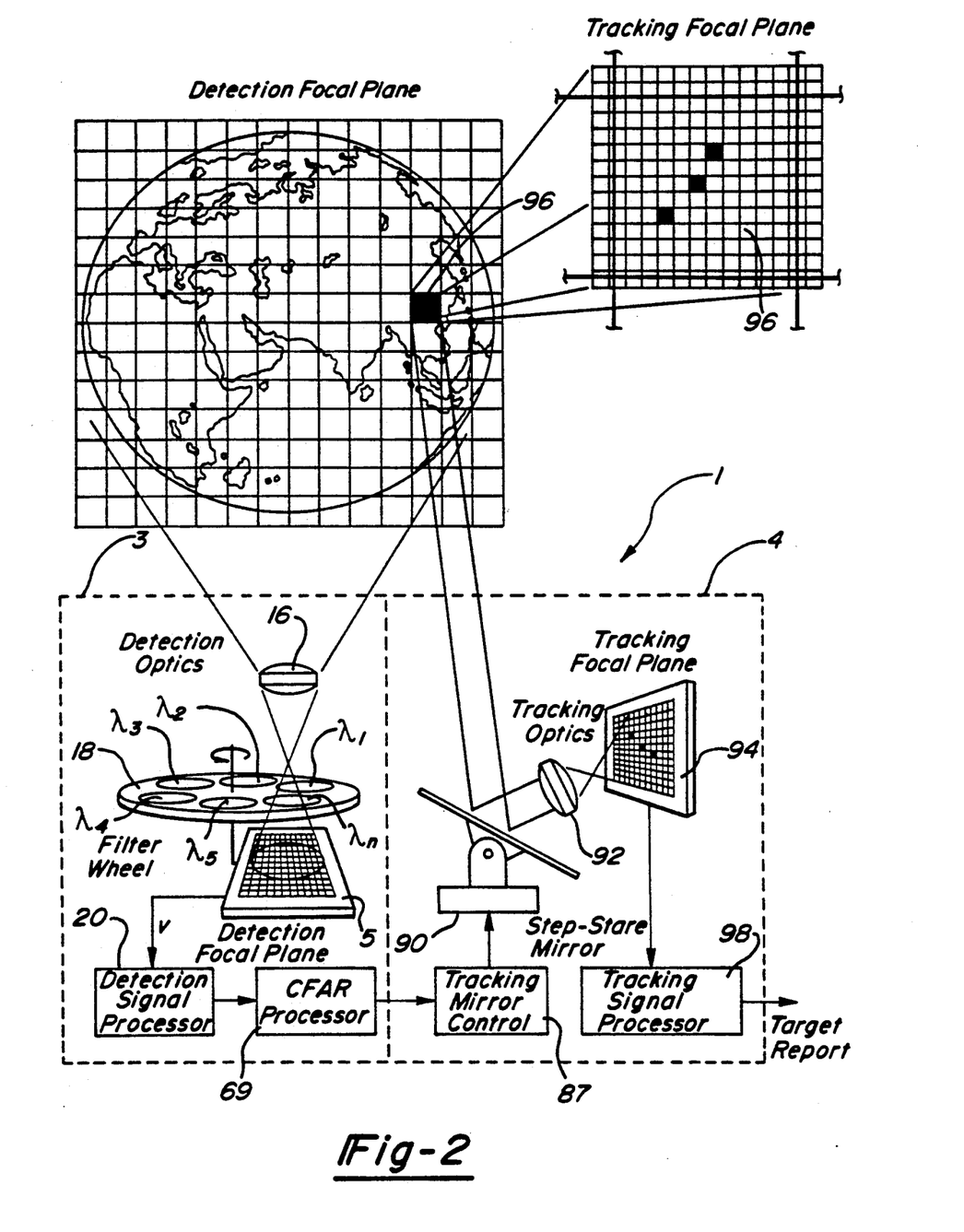
FIG. 2 is a block diagram, similar to FIG. 1, illustrating the system of the present invention in operation after missile launch.

FIG. 2 pictorially illustrates the surveillance system 1 after missile detection and coarse sector location has been made by processor 20. The tracking and counting function of subsystem 4 can be mounted in a separate small telescope 92 cooperating with a step-stare mirror 90 to provide the required counting and tracking functions. The components making up subsystem 4 are also reduced in size and complexity when compared to prior art approaches. It employs, for example, a second monolithic 512 by 512 InSb staring array 94, substantially identical to array 5 of the detection subsystem 3.

The detection subsystem 3 provides the missile sector coordinates on the earth with a low false alarm rate but also with relatively low position resolution. Improved missile position accuracy is provided by the tracking subsystem 4 by viewing the detected sector 96 containing the missiles with a narrow field of view. Mirror control 87 sends an appropriate signal to gimbal the mirror 90 to move it to receive photons from the narrow sector 96 containing the missiles. The narrow field of view tracking optics 92 receives photons from sector 96 and mirror 90 reflects them onto the array 94. Array 94 has a much finer resolution since its ground sample distance is only about 1.7 by 1.7 kilometers, as compared with the 25 kilometer by 25 kilometer ground surface distance of the identically constructed array 5 of the detection subsystem 3. Thus, the tracking array 94 has sufficient resolution to differentiate between individual missiles.

The tracking array 94 is coupled to a tracking signal processor 98. Processor 98 can be of conventional design since the output of the array 94 has essentially the same resolution as the same prior art approaches, although the prior art required a much more complex design using millions more pixels. Tracking signal processor 98, as is known in the art, does several functions. It decides if a true missile detection was made and, if so, it will track it. Tracking is computed by taking a plurality of pixel position detections and computing a curve to determine the direction in which the missile is headed. If there is more than one missile detected, then signal processor 98 will count them to give a total number of missiles detected and tracked. If the signal processor 20 detects the location of missiles in different sectors, mirror 90 can be stepped in a step-stare fashion to other sector coordinates. The revisit time to address all missile sectors in this manner is sufficiently short even in a high detection rate scenario.

Those skilled in the art should now appreciate that the present invention provides a much better surveillance technique with reduced hardware thus resulting in improved reliability, overall component downsizing and lower cost by implementing the surveillance system with many inexpensive and commercially available components. Much of the savings is due to the required numbers of pixels being reduced to the order of about 100,000 pixels, as compared to the millions of pixels used in prior systems. By way of example, it is expected that the weight of surveillance system 1 can be reduced from the aforementioned 6000-8000 pounds to about 1500 pounds. Accordingly, lower cost launch vehicles for the satellite containing the inventive surveillance system can be utilized. Still other advantages of the present invention will become apparent to those skilled in the art after having the benefit of studying of the foregoing specification and the following claims.

What is claimed is:

1. A surveillance system for detecting and tracking a missile flying above the earth's surface, said system comprising:
    a) detection subsystem means for detecting and coarsely locating the missile, said detection subsystem including:
        1) a first focal plane array having a grid of pixels for imaging substantially the entire earth's surface, each pixel having a given ground surface distance;
        2) means for generating, from each pixel in the first focal plane array, a multispectral electro-optical signal input spectrum which includes spectra of the missile and background;
        3) processor means for processing the multispectral electro-optical signal input spectrum of each pixel to separate the missile from the background, said processor means generating a given output signal when the input spectrum contains a multispectral signature of the missile;
    b) tracking subsystem means for tracking a detected missile, said tracking subsystem including:
        1) a second focal plane array having a grid of pixels;
        2) imaging means, coupled to the output signal of the processor means, for imaging a localized sector of the earth's surface containing the detected missile onto the second focal plane array whereby each pixel on the second focal plane array has a much smaller ground surface distance than pixels in the first focal plane array thereby increasing the resolution thereof;
        3) tracking processor means, coupled to the second focal plane array, for tracking the missile; and whereby the surveillance system provides accurate missile detection and tracking using relatively inexpensive and low weight components.

2. The system of claim 1 wherein the first and second focal plane arrays are staring arrays, the first staring array being a fixed array and the second array being a step-stare array.

3. The system of claim 2 wherein the first and second staring arrays each have on the order of 100,000 pixels.

4. The system of claim 3 wherein the first and second staring arrays have a 512 by 512 grid of pixels.

5. The system of claim 4 wherein the detection subsystem further comprises:
    optical means for collecting and imaging radiation from the earth's surface onto the first focal plane array;
    said means for generating said multispectral electro-optical signal input spectrum further comprising means for selecting a plurality of wavelength bands from the collected radiation, each pixel detecting the selected bands of the collected radiation; and
    said processor means simultaneously processing the selected bands of the input spectrum to decompose the input spectrum into multispectral signals representing a missile if present in the input spectrum and background.

6. The system of claim 5 wherein the processor means further comprises:
    means for generating a multispectral template from known information about a missile of interest;
    means for generating a second multispectral template from known information about the background;
    means for using the multispectral templates to determine the degree of correlation of multispectral signals in the templates and in the input spectrum.

7. The system of claim 6 wherein the processor means further comprises:
    means for correlating corresponding bands of the spectral template for the missile of interest and the input spectrum to generate a correlation signal representative of the degree of matching therebetween;
    means for using the correlation signal to generate a weighted multispectral signal for the missile;
    means for similarly generating a weighted multispectral signal for the background;
    means for summing the weighted multispectral signals to generate a feedback spectrum;
    means for subtracting the feedback spectrum from the input spectrum on a band-by-band basis to generate a residue spectrum; and
    means for using the correlation signal to determine whether the multispectral signal of the missile of interest was present in the input spectrum.

8. The system of claim 1 wherein the processor means is an infinite impulse response processor.

9. The system set forth in claim 8 wherein said processor includes an input, a first channel having a known spectral template of the background, a second channel having a known spectral template of the missile, and a feedback path connecting said first and second channels to said input, wherein said multispectral electro-optical signal input spectrum is provided to said input, and wherein the processor:
    applies said input spectrum to said first channel for operating on said background to produce a background signal;
    applies said input spectrum to said second channel for operating on a known component of the missile to produce a missile signal; and
    sums said background and missile signals in a manner to approximate said multispectral electro-optical signal input spectrum.

10. The system of claim 9 wherein the processor correlates the spectral template of the background with the input spectrum and generates a weighted background spectral signal, and correlates said spectral template of the missile with the input spectrum and generates a weighted missile spectral signal; and wherein said processor sums together the weighted background spectral signal and the weighted missile spectral signal, the sum of which is fed back to the input in a recursive manner to generate a residue signal which is iteratively operated on by the first and second channels.

11. The system of claim 9 wherein said first channel comprises:

multiplication means for multiplying on a band by band basis the bands of the spectral template of the background with the input spectrum, means for summing the products of the multiplied background signal together, and means for integrating the sum to provide a first correlation integral output signal for the background; and wherein the second channel includes means for multiplying corresponding bands of the spectral template of the missile with the input spectrum to provide a multiplied missile signal, means for summing the products of said multiplied missile signal together, and means for integrating the sum to provide a correlation integral output signal for the missile; and tracking mirror control coupled to the correlation integral output signal of the missile to move the imaging means so as to image the localized sector of the earth's surface containing the detected missile onto the second focal plane array.

12. The system of claim 11 wherein the electro-optical signal input spectrum has a plurality of distinct wavelength bands, each band being in the range of between about 2.0 to 5.5 microns.

13. The system of claim 12 wherein there are about 6-7 bands in the input spectrum.

14. The system of claim 13 wherein the bands in the input spectrum and in the spectral templates of the missile and the background are equal in number.

* * * * *